Oct. 16, 1956  S. KOSAK, JR  2,767,285
BEARING TEMPERATURE RESPONSIVE SAFETY DEVICE
Filed March 1, 1954
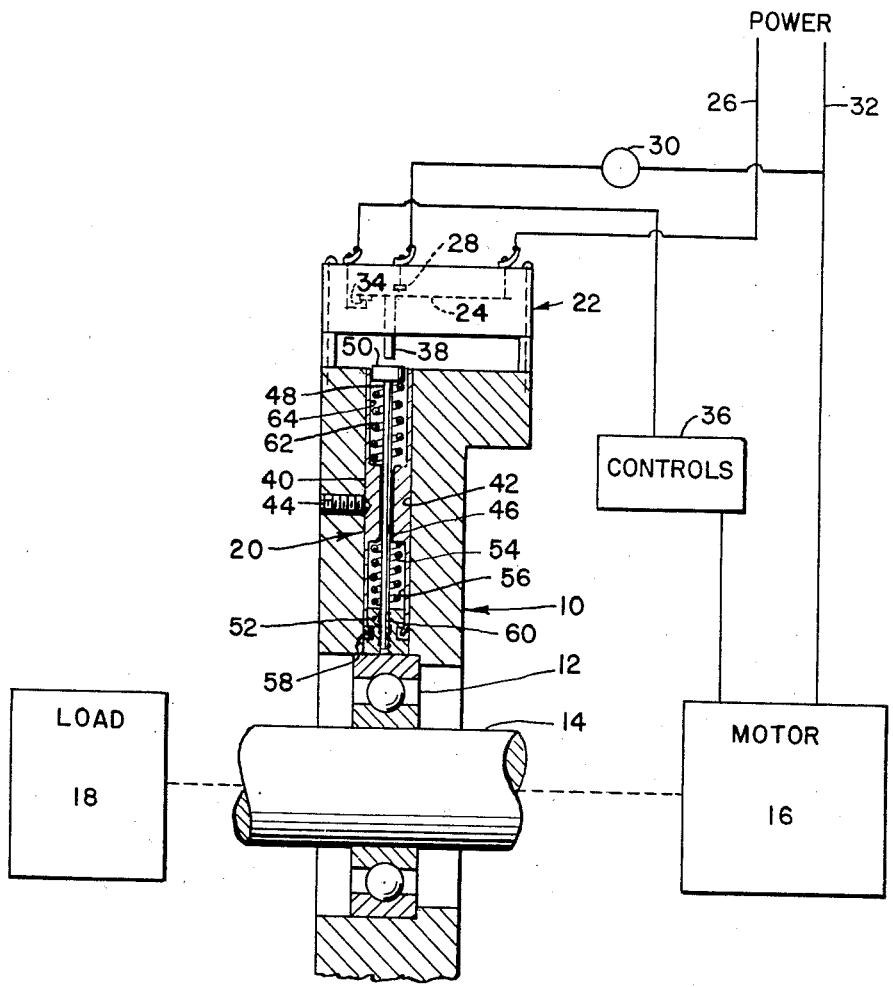
INVENTOR
STEPHEN KOSAK JR.
BY *Godfrey B. Speir*
ATTORNEY United States Patent Office 2,767,285
Patented Oct. 16, 1956

2,767,285

BEARING TEMPERATURE RESPONSIVE SAFETY DEVICE

Stephen Kosak, Jr., Little Falls, N. J., assignor to Curtiss-Wright Corporation, a corporation of Delaware Application March 1, 1954, Serial No. 413,147

4 Claims. (Cl. 200—142)

The present invention relates to temperature-responsive safety devices for the protection of bearings and other mechanisms which may become damaged if operated at excessive temperatures. In particular, the invention consists in a fusing device, responsive to excessive temperatures, which is operable upon fusing to shut down a mechanism or otherwise to terminate operation of the system creating excessive temperature conditions.

It is known that the prior art provides for fusing of apparatus, and that temperature indicators frequently have been used whereby an operator can observe operating conditions of apparatus. Should the indicated temperatures become excessive, the operator may shut down the apparatus to avoid damage thereto.

In the present invention, a simple fusing apparatus is provided which, when it responds to excessive temperature, operates a switch. Either opening or closing, according to the nature of the apparatus, the switch may cause a shutdown thereof, automatically, or may terminate that phase of the operation of the apparatus which creates excessive operating temperatures.

My invention is particularly applicable to plain or anti-friction bearings, which when partially failed due to lack of lubrication or other causes, operate at excessive temperature. After partial bearing failure, failure or destruction of the associated machine is preventable if the bearing failure is sensed and the machine shut down. The invention is useful to sense bearing failure and to shut down an associated machine.

A principal object of the invention is to provide a temperature responsive safety device for transmitting a temperature indication to a control circuit. Another object is to provide a safety arrangement which, once operated, cannot be re-set. This requires servicing or operating personnel to determine the cause of failure or excessive temperature before operation of the system can be resumed.

The details of the invention may be understood from viewing the attached drawing, in connection with the following detailed description. The drawing shows a cross-section through the fusing element of a bearing temperature safety device, in conjunction with a bearing, and further shows schematically, the manner in which the safety device is utilized.

In the drawings, I show a portion of a machine structure 10 serving as a mounting for a bearing 12, the bearing supporting a normally rotating shaft 14. The shaft 14 may serve as a driving member from a motor 16 or other motive device to a driven load 18 of any appropriate sort. It is to be understood that the elements 10, 12 and 14 may be incorporated either in the motor 16 or the load 18 or in a transmission system therebetween, the bearing being provided with appropriate lubrication. It is presumed that the bearing 12 may be sensitive to temperature rise during operation and at times, may be subject to excessive temperature which could cause bearing failure and thus ruin the mechanism.

To guard against excessive temperature rise, a safety fuse 20 is associated with the bearing 12 and the housing 10 and is arranged to operate, upon the occurrence of excess temperature, a switch 22 of any appropriate type. As shown, the switch 22 includes an arm 24 connected at one end to one limb 26 of an electrical power source. A portion of the strip 24 may engage at times a contact 28 connected through an indicator 30, such as a lamp, to the other limb 32 of an electrical power source. The strip 24 normally engages a contact 34 connected through a normal control mechanism 36 to the motor 16. The power source limb 32 is also connected to the motor 16. Under normal conditions, the motor is energized through the switch 22 and can be controlled by the system 36. Should excess bearing temperatures occur, an actuator 38 raises the switch strip 24 from the contact 34, breaking the energizing circuit to the motor 16. Concurrently, the switch strip 24 may close on the contact 28 energizing the indicator 30 to show that the system is shut down and that the system has been exposed to excessive bearing temperature.

The temperature sensitive arrangement 20 comprises a cylinder 40 which may be secured in a bore 42 in the housing 10 by a set screw 44. The cylinder 40 has a through bore 46 through which passes a stem 48 having a button 50 at its upper end (as shown) which is engageable at times with the switch actuator 38. The lower end of the stem 48 engages a contact element 52 which is resiliently urged by a spring 54 into contact with the outer non-rotating race of the bearing 12. The lower end of the cylinder 40 is provided with a counter-bore 56 to receive the spring 54 and to hold the contact element 52 for axial movement. The lower end of the cylinder 40 may if desired be inturned as at 58 to hold the contact element 52 in the cylinder when the fuse assembly 20 is separated from the housing 10. The contact element 52 is as large as possible where it contacts the bearing to maximise heat transfer thereto.

The stem 48 is secured in the contact element 52 by fusible metal indicated at 60. This metal may be in the form of a solder or the like which has a melting point corresponding to the limiting bearing temperature at which the bearing 12 is to be allowed to operate. Such solders may be compounded to melt at particular temperature, and the range of melting points for such solders is quite broad.

Under normal operating conditions, where the bearing temperature is relatively low, the stem 48 and its button 50 is held out of engagement with the switch actuator 38 by the contact element 52. If excess temperature should occur in the bearing 12, this temperature is transmitted to the contact element 52 and when the melting point of the solder at 60 is reached, the stem 48 will be released from the contact element 52. Thereupon, the stem 48 and its button 50 will be raised, as shown, under the influence of a spring 62 disposed in a counterbore 64 in the upper part, as shown, of the cylinder 40. The spring 62 bears at its upper end on the bottom of the button 50 and at its lower end on a shoulder formed by the bottom of the counterbore 64, thereby raising the button 50 with sufficient force to operate the switch 22 through its actuator 38.

The lower spring 54 which firmly engages the contact element 52 with the bearing outer race, preferably exerts a greater force on the element 52 than that exerted by the upper spring 62 on the button 50, the lower spring therefore overpowering the upper spring to assure good thermal engagement of the contact element 52 with the bearing race. However, when the fusing metal 60 melts, the spring 62 is free to expand and to raise the stem 48 and its button 50 to cause actuation of the switch 22.

It will be seen that the fuse assembly 20 is a self-contained device which can be assembled in or removed from a mechanism quite easily. The fuse assembly may be secured as shown or it may be constructed so as to be screwed into the housing 10 or otherwise retained therein. Should the fuse operate, that is, if the fuse metal 60 should melt, the fuse cannot be restored to operative condition without removing it in its entirety from the housing 10. This precludes the possibility of re-starting the overall mechanism without investigating the reason for the occurrence of excessive temperatures in the bearing 12.

It is apparent that the fusing arrangement of the invention along with its utilization, is quite simple and is susceptible to considerable modification to adapt it for various installations and utilizations.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention.

What is claimed is:

1. A temperature responsive actuator comprising a cylindrical support having an internal abutment therein and having a coaxial stem passing therethrough, an element secured to one end of said stem by a meltable alloy, coaxial spring means within said support and between said support abutment and element urging said element into contact with an associated device subject to elevated temperature, said stem having means at its other end engageable with a mechanism, and second spring means within said support and between said support abutment and means urging the latter toward mechanism engagement, said means being normally restrained from said engagement by the meltable alloy securement of said element to said stem.

2. A protective arrangement for a housed bearing, the housing having a bore, comprising a cylinder in said bore and removably secured to the housing, an abutment within said cylinder, a contact element slidable in said cylinder and engaging the bearing, resilient means coaxial in said cylinder engaging said abutment and normally urging said contact element into engagement with the bearing, a stem slidably extending through said cylinder, a fusible metal connection between said stem and contact element, and second resilient means coaxial in said cylinder, weaker than and opposing the first resilient means, engaging a portion of said stem and said abutment operable to eject said stem from said cylinder upon fusing of said metal connection.

3. An arrangement according to claim 2, including a switch on said housing, and means for operating said switch responsive to ejection of said stem from said cylinder.

4. A temperature responsive actuator for a bearing mounted in a housing, the latter having a cylindrical bore open to the bearing, comprising a hollow cylinder engageable within the housing bore and securable thereto for positive axial location, said cylinder having an internal annular shoulder substantially midway of its length, a stem passing substantially coaxially through said cylinder having a button at its outer end, a compression spring coaxial within said cylinder bearing at its ends on said abutment and button, a contact element engaging the other end of said stem at the inner end of said cylinder and slidable relative thereto, fusible metal securing said contact element to said stem, and a second compression spring relatively stiffer than said first spring, coaxial within said cylinder, bearing at its ends on said abutment and on said contact element to hold said contact element in engagement with the bearing.

References Cited in the file of this patent

UNITED STATES PATENTS

| | | |
|---|---|---|
| 1,992,103 | Stapleton et al. | Feb. 19, 1935 |
| 2,172,495 | Bulpitt | Sept. 12, 1939 |
| 2,235,766 | Knaack | Mar. 18, 1941 |
| 2,415,720 | Angel et al. | Feb. 11, 1947 |